United States Patent [19]

Hillmann

[11] Patent Number: 4,997,294
[45] Date of Patent: Mar. 5, 1991

[54] ROLLING BEARING

[75] Inventor: Reinhart Hillmann, Schweinfurt, Fed. Rep. of Germany

[73] Assignee: SKF GmbH, Schweinfurt, Fed. Rep. of Germany

[21] Appl. No.: 521,093

[22] Filed: May 9, 1990

[30] Foreign Application Priority Data

May 12, 1989 [DE] Fed. Rep. of Germany ....... 3915624

[51] Int. Cl.⁵ ............................................. F16C 33/36
[52] U.S. Cl. .................................... 384/484; 384/477; 384/551
[58] Field of Search ............... 384/484, 486, 477, 548, 384/551, 571

[56] References Cited

U.S. PATENT DOCUMENTS 4,336,971 6/1982 Reiter ................................. 384/571
4,692,040 9/1987 Ebaugh et al. ..................... 384/484
4,798,482 1/1989 Kruk ................................... 384/571
4,838,841 6/1989 Harvey ............................... 384/571

FOREIGN PATENT DOCUMENTS 3615343 11/1986 Fed. Rep. of Germany .

Primary Examiner—Lenard A. Footland
Attorney, Agent, or Firm—Rosen, Dainow & Jacobs

[57] ABSTRACT

A rolling bearing has at least two bearing rings which are separated from one another by a spacer, and the joints between the spacer and the bearing rings are sealed with sealing rings. The spacer is a disk with flat end faces which extend over the full height of the disk. The outer periphery of the spacer has at least one sealing ring which projects axially over the end faces of the spacer and rests against surfaces of the adjacent bearing ring.

10 Claims, 1 Drawing Sheet

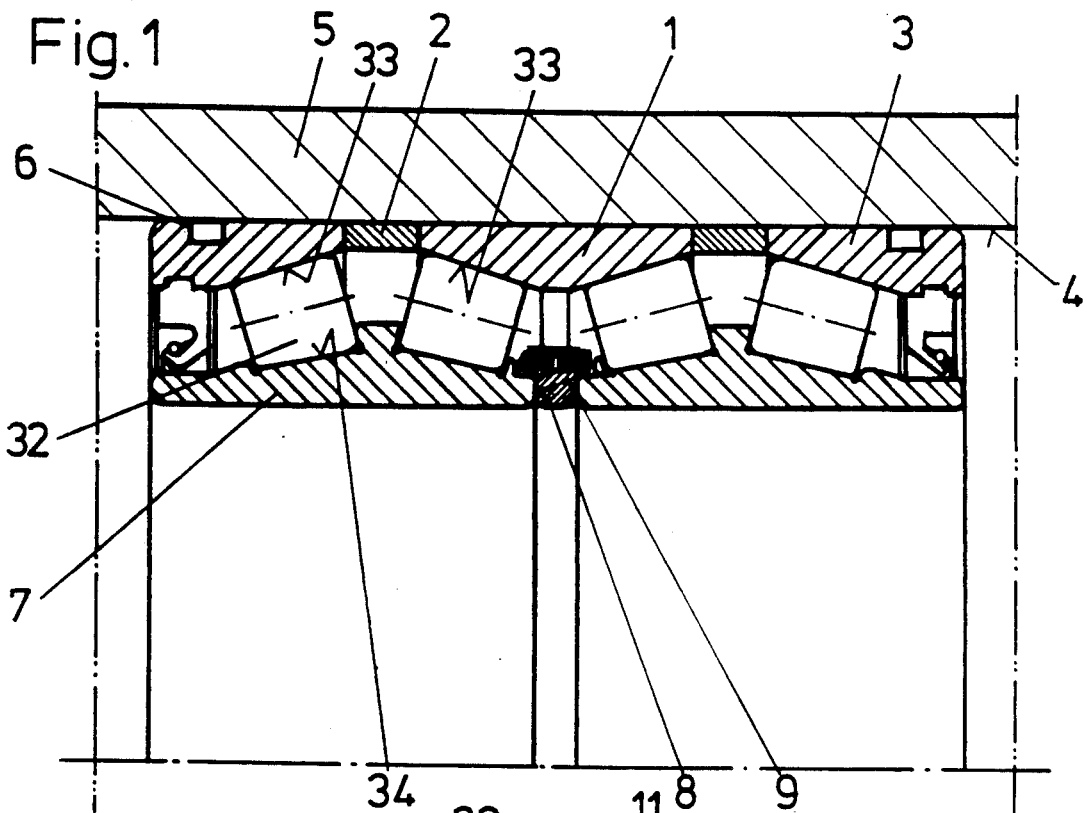
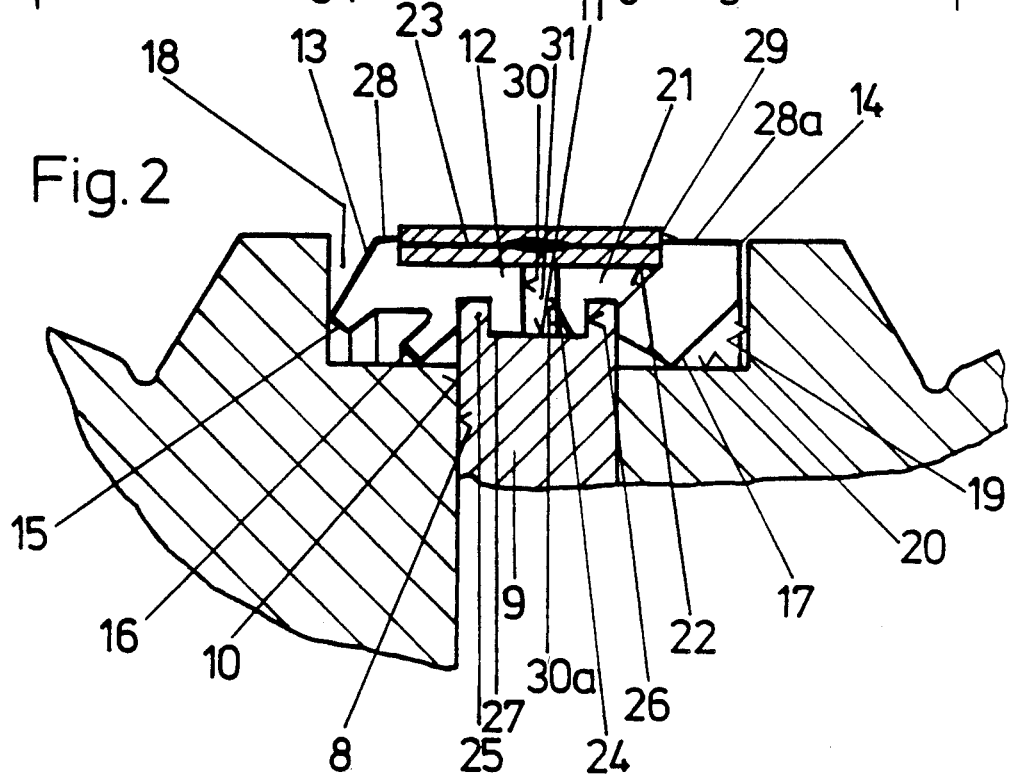

ROLLING BEARING

FIELD OF THE INVENTION

This invention relates to a rolling bearing, and more particularly to a tapered rolling bearing having at least two bearing rings which are separated from one another by a spacer, and wherein the joints between the spacer and the bearing rings are sealed with sealing rings.

BACKGROUND OF THE INVENTION

DE-OS No. 36 15 343 discloses a multiple-row rolling bearing which provides seals for sealing the spacer. In this arrangement, the spacer is a ring having an L-shaped cross-section, and an axially extending section of the spacer rests on the periphery of the one inner ring part, so that the spacer cannot fall radially downward when there is no shaft or rolling spindle in the openings of the inner ring parts.

This arrangement has the disadvantage that the spacer is a relatively complicated component whose end faces cannot be worked with a surface grinder, so that the spacer is expensive to manufacture.

SUMMARY OF THE INVENTION

The object of the invention is to provide a rolling bearing of the above discussed type, in which the spacer is comprised of a simple component which can be manufactured rapidly and economically, and in which the joints between the spacer and the adjacent bearing rings are sealed so that no lubricant can be pushed through the joints and no dirt particles can penetrate the bearing.

According to the invention this object is achieved in a rolling bearing of the above discussed type by providing a spacer that is a disk having flat end faces that extend for the full height of the disk. The outer periphery of the spacer has at least one sealing ring which projects axially over the end faces of the disk and rests against surfaces of the bearing ring. The result of this arrangement is that the sealing ring serves also to hold the spacer in a radial direction, so that it cannot drop into the inner space of the bearing.

According to another advantageous feature of the invention the seal is comprised of two L-shaped sealing rings which have axially extending sections that extend into the opening of a holding ring, and that have radially outward directed sections that rest against the end faces of the holding ring, the holding ring having a width that is greater than the width of the spacer. As a result, it is ensured that the spacer can never fall radially out of the bearing in a downward direction.

BRIEF DESCRIPTION OF THE DRAWING

In order that the invention may be more clearly understood, it will now be disclosed in greater detail with reference to the accompanying drawing, wherein:

FIG. 1 is a longitudinal section of a four-row tapered roller bearing according to the invention with a spacer between the bearing rings and sealing rings to seal the joints, and FIG. 2 illustrates an enlarged view of a portion of the tapered rolling bearing shown in FIG. 1, the right and left sides of this figure showing two different embodiments of the sealing ring.

DETAILED DISCLOSURE OF THE INVENTION

FIGS. 1 and 2 show a four-row tapered rolling bearing in accordance with one embodiment of the invention, having an outer ring with a central outer ring 1, and two axially outer rings 3 separated from the central ring by spacer rings 2. The outer rings 1, 3 are, for example, installed in an opening 4 of a built-in machine element 5, and the joints between the outer rings 3 and the built-in component 5 are sealed with O-rings 6.

The bearing has two inner rings 7, and a spacer 9 is positioned between the opposing end faces 8 of the inner rings 7. The end faces 10 of the spacer 9 are flat. The peripheral surface of spacer 9 has a snap ring groove 11 into which radially inward directed sections 12 of sealing rings 13, 14 are snapped. As shown in the left side of FIG. 2, the sealing rings may have two sealing lips 15, 16 which project over the end faces of the spacer 9 into recesses 18 of the adjacent inner ring. Alternatively, as illustrated on the right side of FIG. 2, the sealing rings may have one sealing lip 17 that projects over the end faces 10 of the spacer 9 into recesses 18 of the adjacent inner ring 7. In both embodiments, the sealing lips 15, 16, 17 rest on the surfaces 19, 20 of the recesses of the inner rings. The sealing rings 13, 14 have L-shaped cross-sections and are mounted with an axially extending section 21 thereof within the opening 22 of, for example, a metal ring 23. The sealing rings 13, 14 have tapered surfaces 24 on the inner edges of the sides thereof facing each other, to facilitate the mounting of the sealing rings 13, 14 in the groove 11 of the spacer 9. In the process of mounting the sealing rings 13, 14, they are pressed into the opening 22 of the metal ring 23 and over the projections 25 of the spacer 9 until the axially outer surfaces 26 of their radially inward extending sections 12 rest against the sides 27 of the snap ring groove 11, and their radially outwardly extending sections 28, 28a rest against the axial end faces 29 of the metal ring 23.

A space 31 is provided between the facing end faces 30, 30a of the sealing rings 13, 14, so that no problems will arise when the sealing rings 13, 14 are snapped into place. The metal ring, which for economical reasons may consist of wound sheet metal and whose windings may be joined, for example, by spot welding, has a greater axial width than the spacer 9. This ensures that the spacer 9 cannot fall out of the bearing in a downward direction, even under radial pressure, when the openings of the inner ring 7 do not contain a shaft.

Four rows of tapered rollers 32 are located between the outer rings 1, 3 and the inner rings 7 of the tapered bearing rollers, the rollers rolling on races 33, 34.

The bearing of FIG. 1 is assembled by first placing the tapered rollers 32 into the pockets of cages (not shown) and arranging them on the races 34 of the inner rings 7. The inner rings are then slid into the central outer ring 1 with the inner rows of rollers on the races 33 of the central outer ring part 1, and with the spacer 9, with the sealing rings 13, 14, mounted thereon positioned between the inner rings 7. Subsequently, the spacer rings 2 are positioned against the outer ring 1, and the outer rings 3 are slid over the tapered rollers 32 of the axially outer rows of rollers. When a shaft or the like is inserted into the openings of the inner rings 7, the spacer 9 is caught between the two end faces 8 of the inner rings 7.

The sealing rings serve to prevent penetration of coolant into the inside of the bearing, since such penetration would lead to corrosion damage. At the same time, lubricant is kept inside the bearing by the two sealing rings 13, 14.

The invention is not limited to the above disclosed embodiment. Thus, the two sealing rings may be replaced by a single sealing ring that projects over both sides 10 of the spacer 9. The ring 23 may be alternatively made of a synthetic material, or other material.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. In a rolling bearing having at least two bearing rings separated from one another by a spacer, and including sealing means for sealing the joints between the spacer and the bearing rings, the improvement wherein the spacer comprises a disk having flat end faces which extend over the full height of the disk, and the sealing means comprises at least one sealing ring mounted on the outer periphery of the spacer, said sealing ring projecting beyond the end faces of the spacer and resting against surfaces of said bearing rings.

2. The rolling bearing of claim 1 wherein said rolling bearing is a tapered rolling bearing.

3. The rolling bearing of claim 1, wherein said bearing ring has a recess adjacent said spacer, and said sealing ring has at least one lip resting on said recess of said inner ring.

4. The rolling bearing of claim 1 wherein the outer periphery of the spacer has a snap ring groove, and the sealing ring has a radially inwardly directed section extending into said groove.

5. The rolling bearing of claim 1 wherein the sealing ring is mounted in the opening of a ring with an axially extending section.

6. The rolling bearing of claim 1 wherein the sealing means is comprised of two L-shaped sealing rings which rest with sections extending radially outward against the end faces of the ring.

7. The rolling bearing of claim 1 wherein the sealing means comprises two sealing rings, and a space is provided between the end faces of the sealing rings that are directed toward one another.

8. The rolling bearing of claim 1 wherein the sealing means comprises two of said sealing rings, and wherein the sealing rings have tapered surfaces at the end faces that are directed toward one another, in the transition area between the central openings of the sealing rings and the end faces.

9. The rolling bearing of claim 1 wherein the ring is comprised of a wound metal strip.

10. The rolling bearing of claim 1 wherein the ring has a greater width than the spacer.

* * * * *